(12) United States Patent
Morovic et al.

(10) Patent No.: US 10,868,943 B2
(45) Date of Patent: Dec. 15, 2020

(54) COLOR MAPPING

(71) Applicants: Peter Morovic, Sant Cugat del Valles (ES); Jan Morovic, Colchester (GB); Juan Manuel Garcia Reyero Vinas, Sant Cugat del Valles (ES); David Gaston Llado, Barcelona (ES); HEWLETT-PACKARD DEVELOPMENT COMPANY, L.P., Houston, TX (US)

(72) Inventors: Peter Morovic, Sant Cugat del Valles (ES); Jan Morovic, Colchester (GB); Juan Manuel Garcia Reyero Vinas, Sant Cugat del Valles (ES); David Gaston Llado, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/305,271

(22) PCT Filed: Apr. 25, 2014

(86) PCT No.: PCT/EP2014/058514
§ 371 (c)(1),
(2) Date: Oct. 19, 2016

(87) PCT Pub. No.: WO2015/161895
PCT Pub. Date: Oct. 29, 2015

(65) Prior Publication Data
US 2017/0048420 A1 Feb. 16, 2017

(51) Int. Cl.
*H04N 1/60* (2006.01)
*G06K 15/10* (2006.01)
(Continued)

(52) U.S. Cl.
CPC .............. *H04N 1/6019* (2013.01); *B41J 2/21* (2013.01); *G01J 3/46* (2013.01); *G06K 15/102* (2013.01);
(Continued)

(58) Field of Classification Search
CPC ........ H04N 1/6019; H04N 1/405; H04N 1/60; H04N 1/6008; H04N 1/6058; B41J 2/21;
(Continued)

(56) References Cited

U.S. PATENT DOCUMENTS 6,238,112 B1 5/2001 Girones et al.
6,283,572 B1 9/2001 Kumar et al.
(Continued)

FOREIGN PATENT DOCUMENTS

WO WO 2014173474 A1 * 10/2014 ........... H04N 1/6025

OTHER PUBLICATIONS

Li, Perry Y. Robust Control and Diagnostic Strategies for Xeroxgraphic Printing.

*Primary Examiner* — Quang N Vo
(74) *Attorney, Agent, or Firm* — HP Inc. Patent Department (57) ABSTRACT

A method for color mapping is disclosed based on obtaining a measurement of one or more characteristics of an imaging system. A set of color mappings are provided and the color mapping is selected based on the measurement. Each of the color mappings enables a mapping from a first color space to Neugebauer Primary area coverage vector space. A method for generating a color mapping is disclosed.

14 Claims, 7 Drawing Sheets

(51) Int. Cl.
  *B41J 2/21* (2006.01)
  *H04N 1/405* (2006.01)
  *G01J 3/46* (2006.01)

(52) U.S. Cl.
  CPC .............. *H04N 1/405* (2013.01); *H04N 1/60* (2013.01); *H04N 1/6008* (2013.01); *H04N 1/6058* (2013.01); *G06K 2215/0094* (2013.01); *G06K 2215/101* (2013.01)

(58) Field of Classification Search
  CPC . G01J 3/46; G06K 15/102; G06K 2215/0094; G06K 2215/101
  USPC ............................ 358/3.06, 3.12, 3.1, 3.23
  See application file for complete search history.

(56) References Cited

U.S. PATENT DOCUMENTS

| | | | |
|---|---|---|---|
| 7,673,958 B2 | 3/2010 | Heiles et al. | |
| 7,724,397 B2 * | 5/2010 | Lee | B41J 29/393 347/40 |
| 2007/0273917 A1 * | 11/2007 | Encrenaz | G06K 15/02 358/1.15 |
| 2011/0096344 A1 | 4/2011 | Morovic | |
| 2012/0075372 A1 * | 3/2012 | Yamamoto | B41J 2/155 347/14 |

* cited by examiner

COLOR MAPPING

BACKGROUND

Imaging systems are arranged to output an image. They may comprise printing or display systems, wherein an output is either a printed or displayed image. In certain cases, an imaging system may experience a variety of conditions that can degrade the output. In a printing system example, there may be malfunctioning nozzles in one or more printer pens or an inadequate quantity of ink. In a display system example, one or more display elements may be inoperative or have a limited light emittance range. This may lead to a substandard output that can in turn lead to wastage or down-time.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths. However, this is a high dimensionality representation and so typically a color model is used to represent a color at a lower dimensionality. For example, certain color models make use of the fact that color may be seen as a subjective phenomenon rooted in the retinal and neural circuits of a human brain. In this case, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*—CIELAB) color space, wherein three variables represent lightness ('L') and opposing color dimensions ('a' and 'b'). Certain color models, such as RGB and CMYK may be said to be device-dependent, e.g. an output color with a common RGB or CMYK value may have a different perceived color when using different imaging systems.

When working with color spaces, the term "gamut" refers to a multi-dimensional volume in a color space that represents color values that may be output by a particular imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

Figure 1:
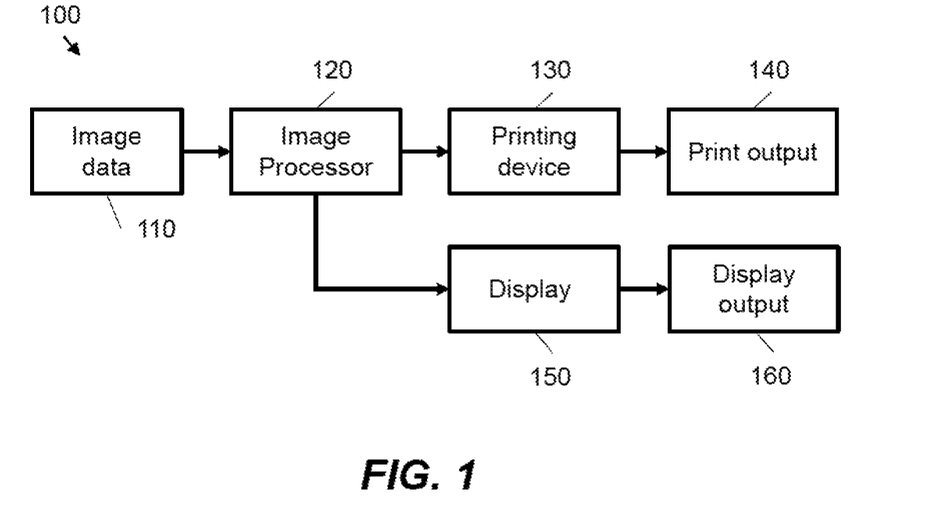
FIG. 1 is a schematic illustration showing certain components of an imaging system according to an example.

FIG. 1 shows an example of an imaging system 100 that may be used with certain methods described herein. In the example of FIG. 1, image data 110 corresponding to an image is sent to an image processor 120. The image processor 120 processes the image data. This processing comprises mapping a color value from a first representation as used within the image data 110 to a second representation as used by an output imaging device. This color mapping, in a first case, uses a default color mapping. In FIG. 1, two output imaging devices are shown: a printing device 130 and a display 150. In this example, the image processor is arranged to output one or more of print control data that is communicated to a printing device 130 and image control data that is communicated to a display device 150. The printing device is arranged to generate a print output 140 as instructed by the print control data. Likewise, the display device 150 is arranged to generate a display output 160 as instructed by the image control date. The color representation used by the printing device 130 and the display device 150 may be different. In one case, the print output may comprise an image formed from colored inks deposited on a substrate. The substrate may be paper, fabric, plastic or any other suitable print medium. Similarly, the display output may comprise an image formed from a plurality of Light Emitting Diodes or Liquid Crystal Display elements. In certain cases only one of the printing device 130 and the display 150 may be used. In certain cases the image processor may be separate from the printing device 130 and/or the display 150. The term "imaging system" may refer to one or more of the printing device 130 and the display 150 with or without the imaging processor.

An imaging system, for example as shown in FIG. 1, has one or more resources. These resources may comprise printer pens, inks and/or nozzles for a printing device and display elements and/or lighting elements for a display device. In certain cases these resources may be limited. For example, certain nozzles may become clogged and/or malfunction or one or more display elements may no longer operate within defined ranges. These cases are referred to herein as a limitation for the resource. Typically, limitations occur through use of an imaging system, e.g. based on statistical failure rates, resource consumption and/or wear.

In certain examples described herein, an availability of one or more resources is considered in order to provide an alternate color mapping for the imaging system. In particular, one or more limitations for at least one resource may be modelled and used to derive one or more alternative color mappings. The alternate color mappings may provide an alternate color mapping to a default color mapping, such that the limitations are addressed with a minimal effect on an imaging metric, such as one or more of perceived output color, graininess and output image robustness to imaging fluctuations. In certain cases, availability of a particular resource may be represented by a look-up table; in this manner a set of pre-computed limitation look-up tables may be used to improve performance of the imaging system when one or more limitations are imposed upon it. Such limitation look-up tables may be dynamically referenced during printing to compensate for limitations in the imaging system. This process will now be described with reference to the examples of FIGS. 2 and 3.

Figure 2:
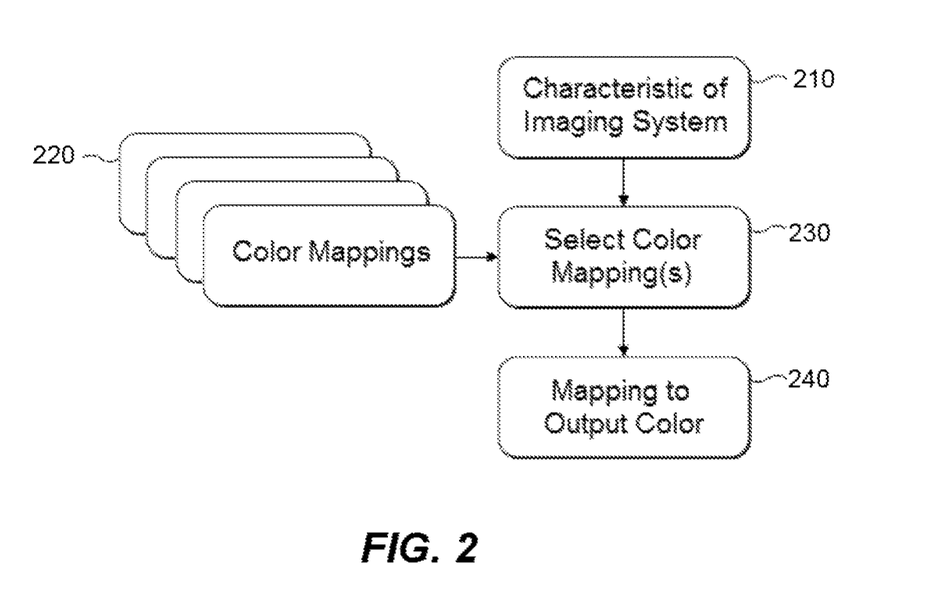
FIG. 2 is a flow chart showing a method of selecting a color mapping according to an example.

FIG. 2 shows an example method of selecting a color mapping based on a characteristic of an imaging system. The method begins at block 210 wherein a measurement of one or more characteristics of an imaging system is made. In a printing example, the characteristic may relate to, amongst others, one or more ink-levels, the number of functioning nozzles in one or more print heads, or an ink-usage limitation. The measurement may be made based on one or more control signals provided and/or used by the imaging device. For example, a printing device may comprise a mechanism to monitor ink levels and/or a mechanism to monitor electromagnetic properties of one or more piezo-electric actuators forming part of a print head nozzle. Likewise, a display device may measure electromagnetic properties associated with one or more display elements. At block 220 a plurality of color mappings are provided. These color mappings may be generated according to the method of FIG. 3. The measurement provides information on the most suitable color mapping to select. For example, the color mappings may be indexed by one or more ranges associated with the measurement; e.g. if, in a printing device, 20% to 30% of nozzles in a Cyan print head are malfunctioning this may indicate a particular color mapping associated with this range and colorant. In one case, a color mapping that provides optimal performance for the imaging system may be selected, notwithstanding any resource limitation indicated by the measurement. A default color mapping may be selected if the measurement indicates that the imaging system is functioning without limitation. Other color mappings provided in addition to the default color mapping represent alternate color mappings for selection when a limitation is imposed on the imaging system. At block 230, the color mapping is selected based on the measurement. At block 240, the color mapping is used to provide a mapping from a first color space, e.g. a color space in which the image data 110 is represented, to a second color space, e.g. a color space in which print and/or display data is represented.

Figure 3:
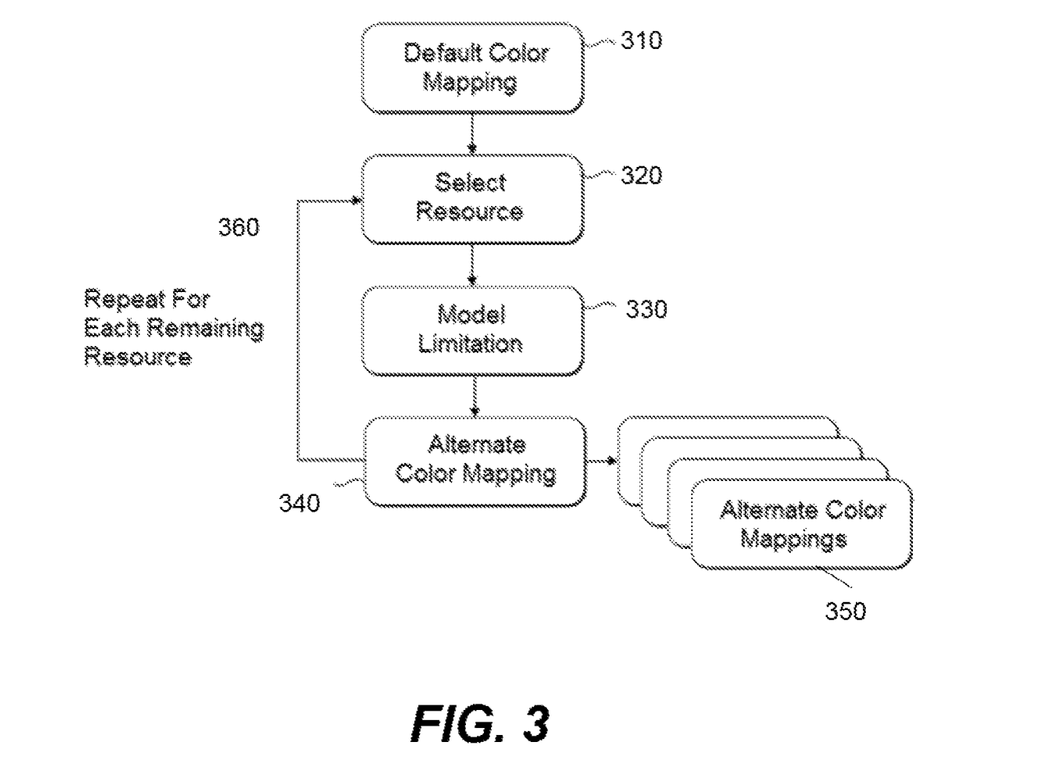
FIG. 3 is a flow chart showing a method of modelling a limitation on the imaging system according to an example.

FIG. 3 shows an example method for obtaining alternate color mappings. This method may be used to generate one or more of the color mappings provided in block 220 of FIG. 2. The alternate color mappings may be used when a limitation is imposed on, or experienced by, the imaging system 100.

In the example of FIG. 3, a default color mapping is first provided at block 310. This may be a color mapping that has been pre-computed to provide a mapping from the first color space of the image data to the second color space of the output data. The default color mapping may be optimal when an output device such as a printing device or a display is operating within normal parameters. In the example of FIG. 3, a set of alternate color mappings are derived from the default color mapping. In another example, the alternate color mappings may be independently computed, e.g. using a similar process to that used to compute the default color mapping. At block 320 a resource is selected. Examples of resources are described above. At block 330 a limitation for the resource is modelled. For example, in a display device the limitation may be a limitation on the amount of backlight that is provided as compared to a default case. In a printing device, the limitation may comprise a colorant limitation or a limitation on a print area for a colorant. At block 340 an alternate color mapping is computed based on the modelled limitation. For example, if a backlight is modelled as functioning at 80% capacity then a color mapping that increases the lightness of output colors may be selected. If a colorant is deemed to be absent then a color mapping that replicates as closely as possible (e.g. in terms of minimizing a color difference) a default output color without using the absent colorant may be computed. Additionally and/or alternatively, an alternate color mapping may be computed that minimizes an effect on one or more imaging attributes of interest that are mediated by the color map, e.g. graininess or robustness. At block 350 the computed alternate color mapping is added to the set of alternate color mappings. Blocks 320 to 340 may be repeated for a plurality of resources and/or limitations. For example, in a display system wherein a resource comprises a red, green or blue color channel alternate color mappings may be computed for one or more limitations in each color channel. In a printing system, a resource may comprise a particular colorant and thus the method may be repeated for each colorant used by the printing system.

An example in the context of a printing system will now be described. In this example, the output color space is a Neugebauer Primary area coverage (NPac) space. An NPac space provides a large number of metamers, e.g. output color values that map to a common input color value, that facilitate the generation of alternate color mappings.

An NPac represents a distribution of one or more Neugebauer Primaries (NPs) over a unit area. For a binary (bi-level) printer, an NP is one of $2^k$ combinations of k inks within the printing system. For example, if a printing device uses CMY inks there can be eight NPs, these NPs relate to the following: C, M, Y, C+M, C+Y, M+Y, C+M+Y, and W (white or blank indicating an absence of ink).

Figure 4:
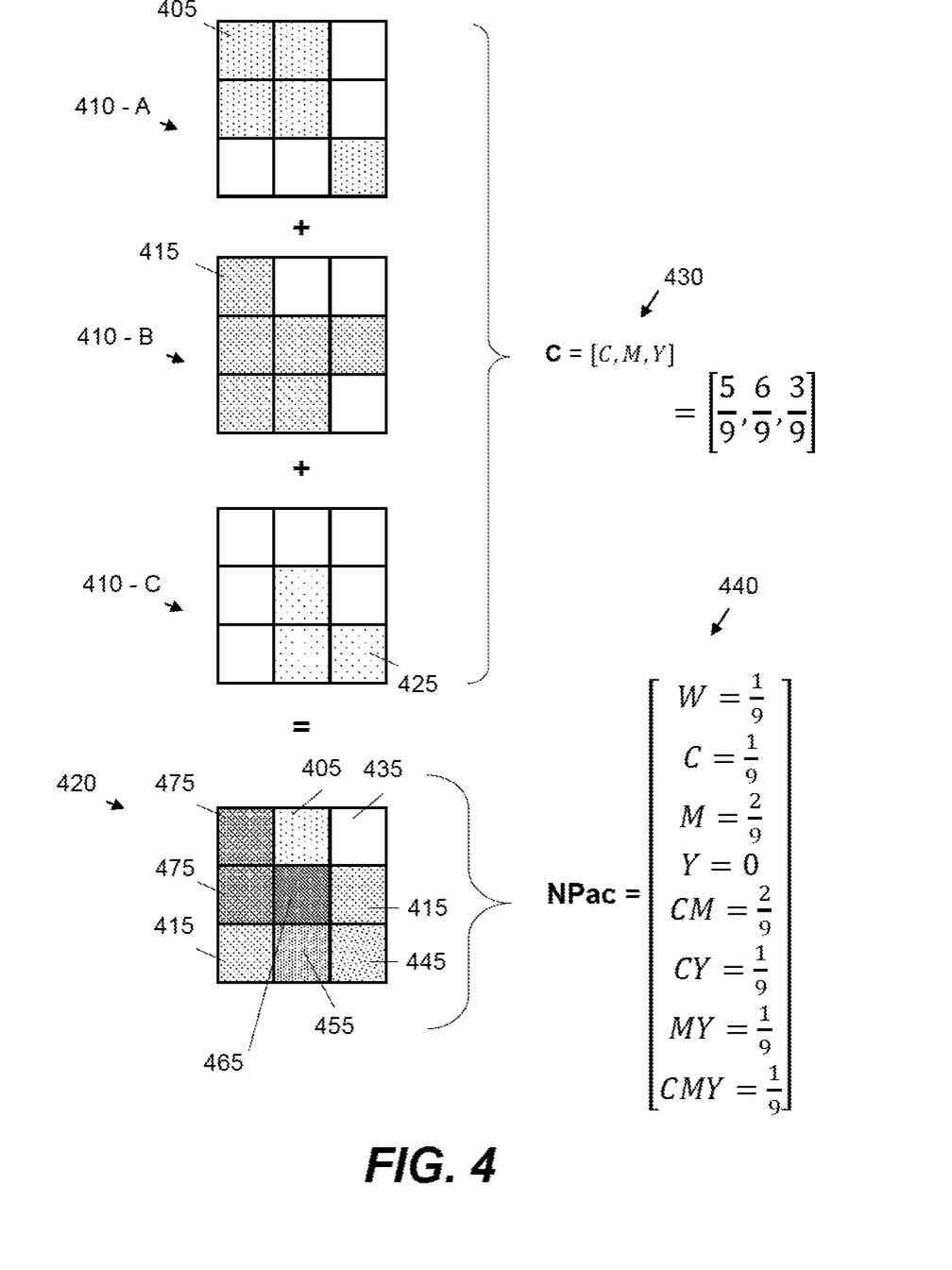
FIG. 4 is a schematic diagram showing an example color representation.

FIG. 4 shows an example NPac vector 440 for a CMY printing system. This example shows a unit area for a printed image that comprises a three-by-three pixel area 420. In implementations the unit area for an NPac may depend on the resolution of the printing system (e.g. in dots per square inch). The NPac vector defines the area coverages of the eight NPs for the unit area. For example, in this case: one pixel of White (W) (435); one pixel of Cyan (C) (405); two pixels of Magenta (M) (415); no pixels of Yellow (Y); two pixels of Cyan+Magenta (CM) (475); one pixel of Cyan+Yellow (CY) (445); one pixel of Magenta+Yellow (MY) (455); and one pixel of Cyan+Magenta+Yellow (CMY) (465). As can be seen, the component values of each NPac vector sum to one, i.e. to represent the total area of the unit area.

As shown in FIG. 4, the NPac vector 440 is equivalent to an additive print operation with three colorants C, M and Y. For the Cyan colorant 405 five pixels are to be printed as shown by the pattern 410-A. For the Magenta colorant 415 six pixels are to be printed as shown by the pattern 410-B. For the Yellow colorant 425 three pixels are to be printed as shown by the pattern 410-C. In this example, each colorant is to be overprinted, e.g. each pattern 410-A to C is to be printed in order within a three-by-three pixel area. A colorant vector 430 representing the different proportions is also shown.

Although an example three-by-three pixel area is shown in FIG. 4, this is for ease of explanation; the unit area may be of any size and/or there may be multiple levels of units. For example, each pixel of a halftone may have a corresponding NPac vector. In this case, in a binary printing system, for a halftone pixel, one NP may have a value of 1 and the other NPs may have a value of 0. However, this pixel may form part of a halftone neighborhood, e.g. a three-by-three area as shown, that itself is defined by an NPac vector. In this case errors between a proposed and actual NPac vector may be propagated to neighboring areas. Likewise, although CMY system is used for ease of explanation, other printing systems may be used.

An example of a print system that uses NPs in image processing is a Halftone Area Neugebauer Separation (HANS) printing pipeline. HANS is an image processing system using NPs, NP area coverages (NPacs) and halftoning. A HANS pipeline uses NPs and NPacs as the domain within which color separation is defined, rather than ink vectors as is the case in traditional pipelines. HANS changes the indexing space in which a color separation process (i.e. a color mapping from RGB space to NPac space) and a halftoning process communicate from the conventional ink space to the NPac space. In this context, a halftone image on a substrate comprises a plurality of pixels wherein the spatial density of the pixels controls the colorimetry of area of the image. A halftone pixel comprises one or more droplets of ink fluid released for example, by the nozzles in a printing head of a printing device. The result of a plurality of halftone pixels results in a halftone image comprising regions of varying colorimetry. Halftoning is employed to reproduce a print of an original image that may be represented by image data 110. A halftone pattern may be generated. An algorithm may be used to generate a halftone pattern. The halftone pattern is applied to image data to obtain a halftone image to be printed using device software. A halftone image may be printed using one or more printing fluids or inks. In an NPac printing system, one or more NPac vectors define the colorimetry of a halftone area; in this case, a halftoning process implements the area coverages on a print substrate.

Figure 5:
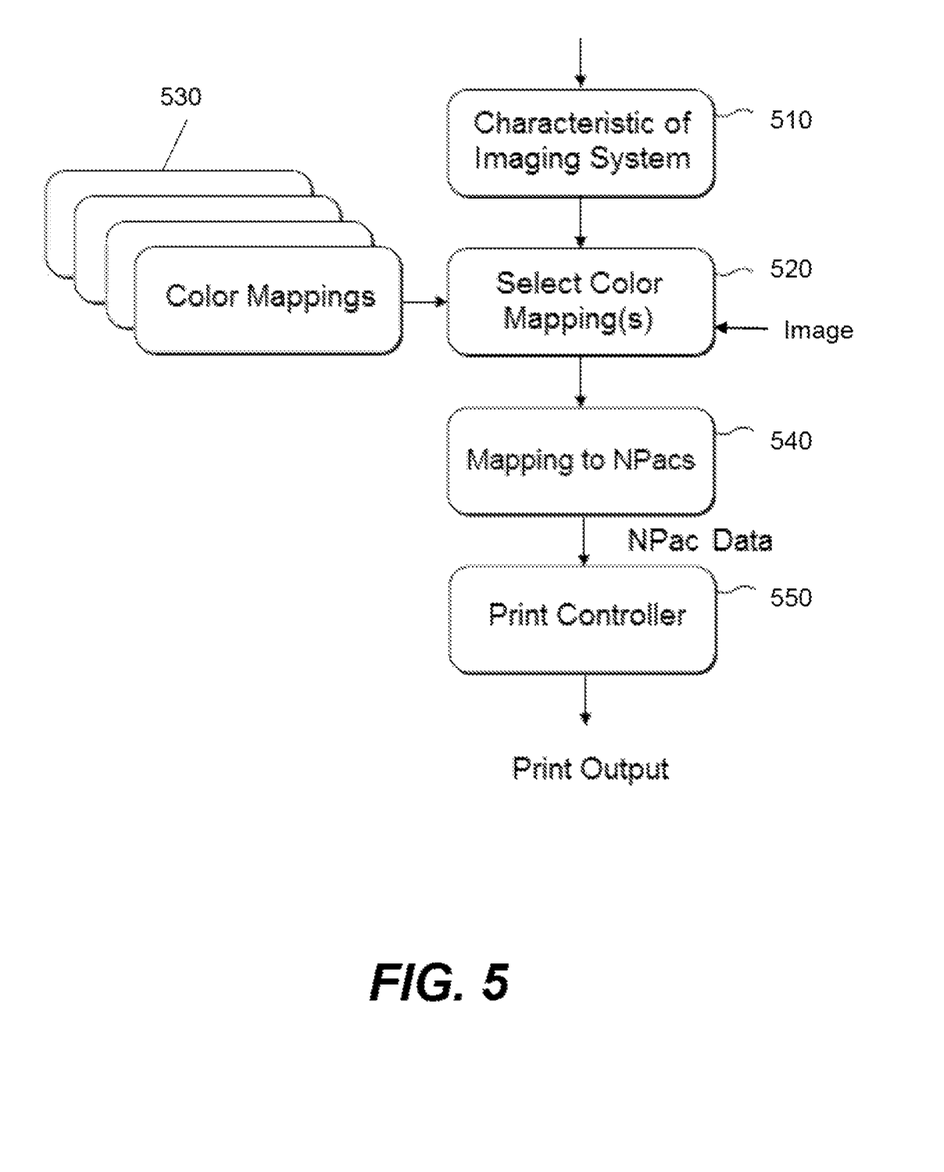
FIG. 5 is a flow chart showing a method of color mapping according to an example.

FIG. 5 shows an example where the methods of FIGS. 2 and/or 3 may be applied within a printing system that uses NPac vectors as an output color space. The method starts with an image to be printed. At block 510, a measurement of a characteristic of the imaging system is obtained. This may be, for example, obtained from print diagnostic data, such as information on functioning print nozzles and/or ink levels. At block 520, a color mapping is selected from a set of color mappings 430 based on the measurement. The color mappings may be generated according to the example of FIG. 3. As such, each color mapping may be associated with a particular limitation for a resource and that limitation may be indicated by the measurement from block 510. At block 540 the selected color mapping is used to map from a color space of the image data to an NPac color space. The color mapping may map, for example, from an RGB color value for a pixel to an NPac vector. At block 550 a print controller uses the NPac data to produce a print output.

In the example of FIG. 5, a color mapping in the set of color mappings 530 may be associated with a limitation for a particular colorant or set of colorants. For example, a resource may comprise a particular NP. In a simple case, a limitation may comprise the availability of that resource. For example, a resource selected at block 320 may be a cyan colorant and the limitation may be that there is no cyan ink left in a print cartridge. This limitation may be modelled at step 330 by reducing a volume of a gamut associated with a default color mapping. This may result in a reduced volume gamut that is used as a basis for an alternate color mapping that does not use the resource, e.g. an alternate color mapping that generates an NPac vector with C, CM, CY and CMY equal to 0. In this case, a second alternate color mapping may relate to an absence of a yellow colorant, a third alternate color mapping may relate to an absence of magenta etc., until an alternate color mapping has been generated for each NP. The alternate color mappings may be computed off-line, e.g. prior to the application of the method of FIG. 5.

In one case, a color mapping may be associated with a particular colorant. For example, the number of color mappings may equal the number of inks plus one, the extra color mapping being a default color mapping and each of the other color mappings being associated with minimal use of a particular colorant. Hence, for a printing system using CMY inks there may be four color mappings, i.e. three alternate color mappings: one to minimize use of each inks in turn, plus the default color mapping that uses all inks normally. Similarly, for a CMYKcm printing system, seven color mappings may be used.

In certain examples, a feedback system may be used to monitor the status of the imaging system and determine whether a limitation is imposed at any given time, e.g. via a measurement of one or more characteristics of the imaging system. For example, in a printing system, cyan ink may be readily available at an initial point in time but then, at a later point in time, the feedback system may detect that the cyan ink is running low or nozzles in the print head have started to misfire or malfunction. In this case, data from the feedback system is used to select an appropriate color mapping, e.g. a color mapping that minimizes the use of cyan ink, to continue printing without compromising the performance of the printing system. In certain cases, the feedback system may continually monitor the imaging system with the ability to detect a limitation on the imaging system and to influence the selection of color mapping.

In certain examples, the feedback system may operate on multiple levels. In these examples, one or more levels of feedback may be active at any one time. On one level the feedback system may operate using closed-loop feedback of the imaging system during imaging-time, e.g. diagnostic data from a printer may be used to determine one or more limitations, the one or more limitations then allowing different color mappings to be selected during a print job. In this case the feedback may be real-time or near real-time. On another level, general or statistical data associated with the imaging device may be used to set configuration data for the imaging device, e.g. at start-up and/or after a predetermined time period a state of the imaging device may be used to determine a suitable configuration. In this case, the configuration data may indicate a color mapping that takes into account the state of the imaging device. In a printer example, the configuration data may result in a reduced use of certain printer pens. In this case, if it is known from printer data that certain printer pens are performing poorly, and/or have low ink levels, alternate printer pens may be selected. For example, a color mapping may use a number of colorants such that ink use is evenly distributed across a set of printer pens, such a setup may not use particular printer pens that have a low ink level when there is a choice of several pen-ink combinations.

In certain implementations, a color mapping may be implemented using a look-up table. For example, a color mapping between an RGB color space and an NPac color space may comprise a look-up table that maps particular RGB values to particular NPac values. The values that form each part of the look-up table are referred to as "anodes". Each node corresponds to a row of the look-up table. Color mapping for values between the nodes is then provided using interpolation. The interpolation may be linear or non-linear. In certain cases, a look-up table may be representative of a color mapping between multiple color spaces, e.g. may be generated through a concatenation of an RGB to XYZ color mapping and an XYZ to NPac color mapping.

Figure 6:
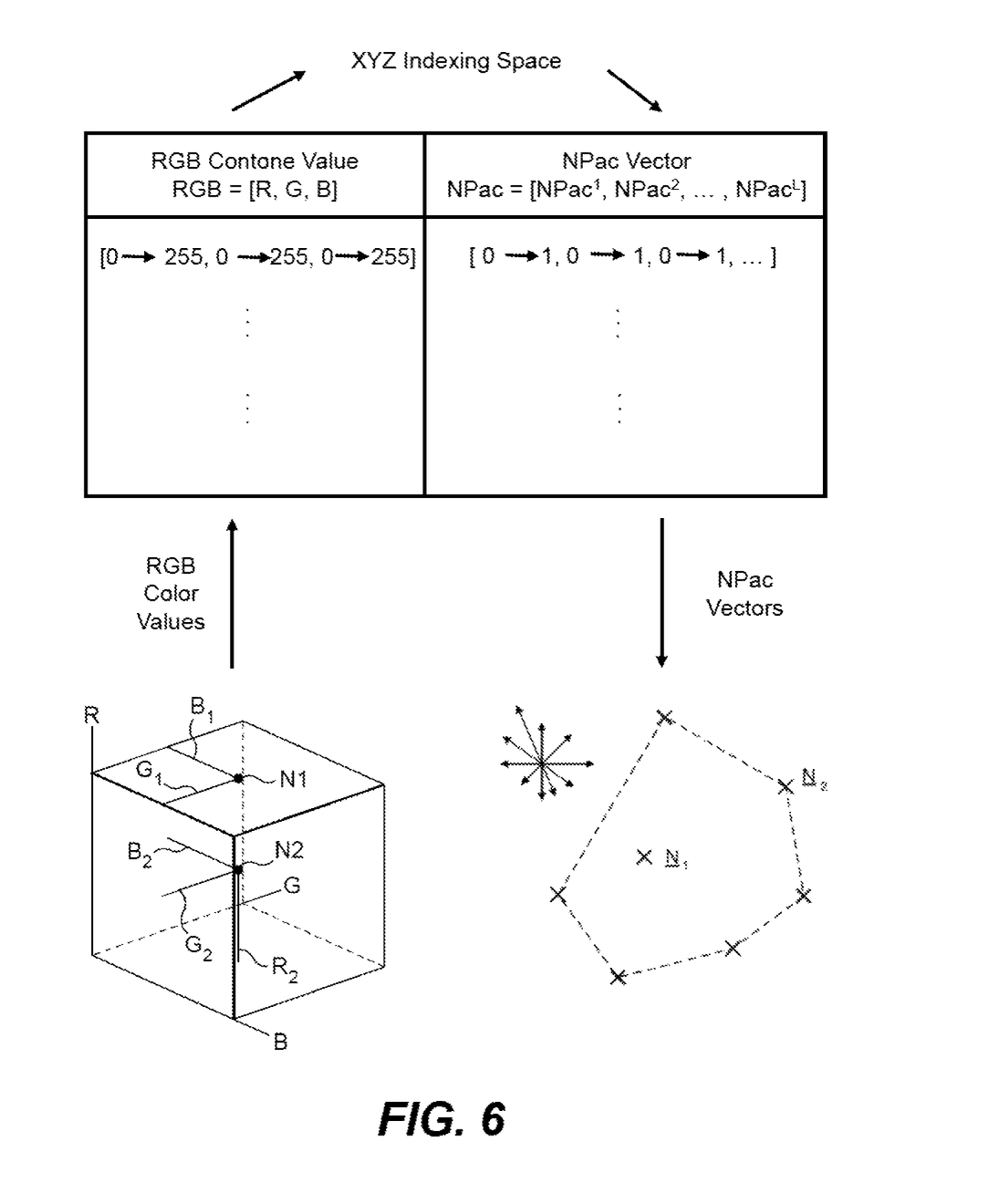
FIG. 6 is a schematic illustration showing a look-up-table for a color mapping according to an example.

FIG. 6 shows a representation of a look-up table according to an example. The look-up table of FIG. 6 maps color values from an RGB color space to an NPac color space. Although shown as two-dimensional for ease of explanation, an actual look-up table would have multiple dimensions, e.g. in this case a mapping being from three dimensions to eight dimensions (for CMY). Each node is indexed by an RGB value and provides an output NPac vector value that, when provided as a halftone over a unit area, results in a colorimetry (e.g. in XYZ or Lab space) that is chosen to map to the RGB value. FIG. 6 shows by way of example an RGB space with a surface node N1 having coordinates R1, G1, B1 and an interior node N2 having coordinates R2, G2, B2. The nodes at the surface (of the cube in this example) may be regarded as being in a layer at the surface. Successive layers of nodes lie below the surface. Thus, the look-up table provides a discrete, non-continuous, representation of the colors to be printed. While the present example relates to an RGB color value to be printed using a CMY bi-level set-up, which would have output values with up to eight NPs and their respective area coverages, in practice the output space would depend on the printing system that was used, e.g. a three-level (0, 1, 2 drop) CMYK system may have up to eighty-one NPs and their respective area coverages.

Figure 7:
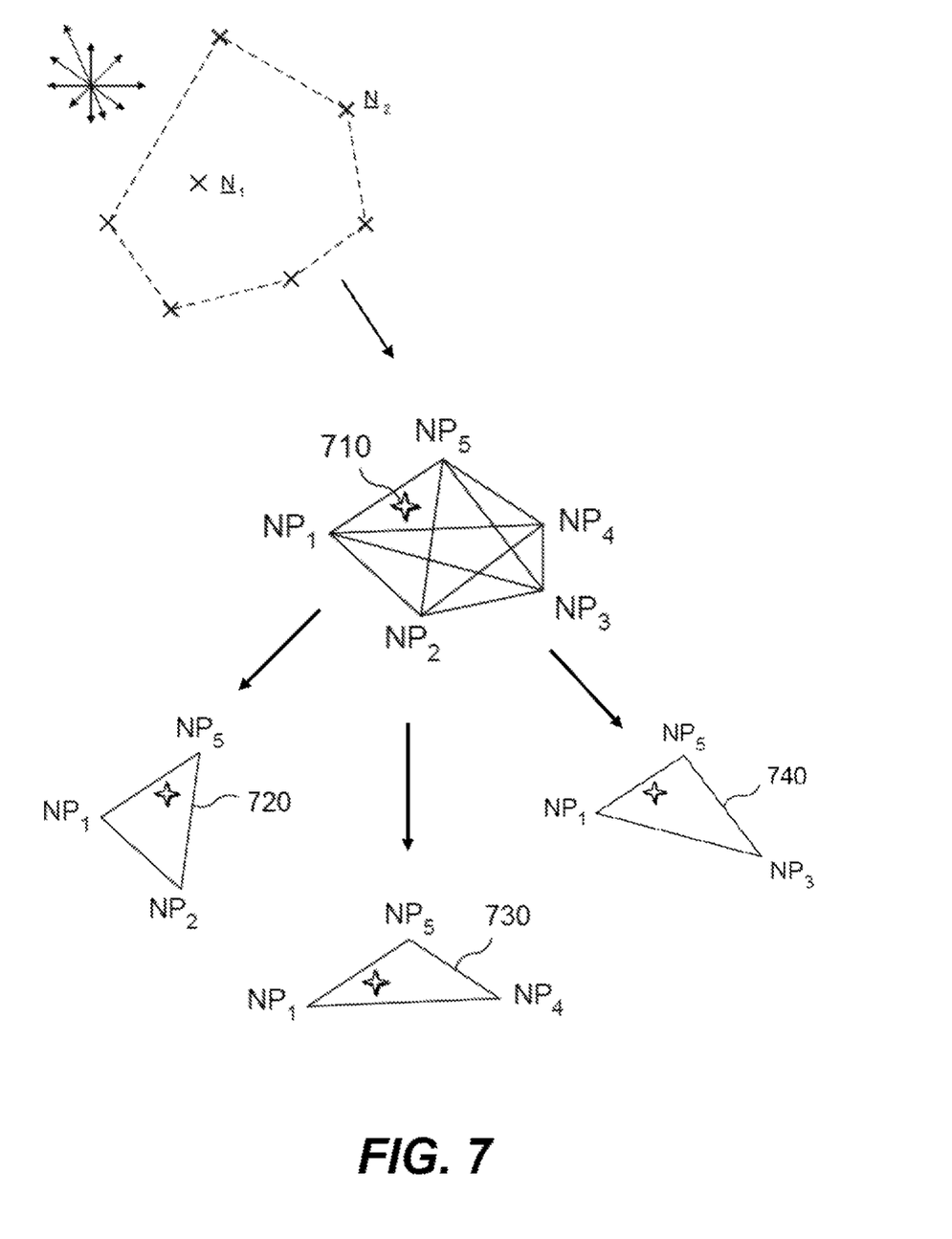
FIG. 7 is a schematic illustration showing a method for printing a metamer.

One example of determining a color mapping that incorporates a limitation for a resource will now be described with reference to FIG. 7.

For a printing system that has all of a number of printable inks available and all nozzles in each print head fully functioning, a full gamut is available and a default color mapping may be used. If then an ink runs low or nozzles malfunction, the full gamut may no longer be available due to a limitation imposed on a at least one resource of the printing system. In this case, the limitation modifies the volume of the gamut of available colors, e.g. a limited gamut volume may be considered as a reduced volume compared to a gamut of a fully-functioning printing system. In this manner, one or more limitations imposed by a set of resources restricts the colors that the printing system is able to print.

Modelling a limitation on a printing system, for example as shown in block 330 of FIG. 3, may comprise accessing or generating an alternate color mapping in the form of a limitation look-up table. A limitation look-up table represents a color mapping to a constrained gamut in a second color space, e.g. when mapping to an NPac space, having fewer NPacs that are available to the printing system. A limitation look-up table may be derived from a default look-up table representing a fully functioning imaging system or may be generated independently. A limitation look-up table may be pre-computed before the method of FIG. 4 is implemented. A pre-computed look-up table allows for a limitation in an imaging system to be dynamically compensated for by referencing one or more limitation look-up tables during the implementation of the method of FIG. 4.

A limitation look-up table is complete if for every input color value in the look-up table there is a corresponding output color value. As discussed previously, color value mappings within each row of a look-up table may be referred to as nodes. In certain cases a modelled limitation may produce an incomplete look-up table, i.e. one that does not specify output color values for all input color values. This may be the result of a particular colorant being unavailable. In these cases, interpolation between nodes may be used with a tessellation to complete the limitation look-up table, i.e. in effect, the nodes removed from the default look-up table are replaced with an interpolated output color value and the limitation look-up table then contains a full set of nodes. In a case with RGB input color values, this may comprise a two-step process for each RGB look-up table node: 1) gamut map the RGB's original color to the gamut of the limitation look-up table, and 2) interpolate the mapped color in the limitation look-up table. In this way, all input RGB color values have an output color value that is defined in the limitation look-up table, e.g. in the form of an NPac value. In one case, when a mapped output color value of a limitation look-up table is interpolated, the interior color values of the output color gamut that were removed when modelling the limitation of the resource may be replaced by convex combinations of their neighboring nodes.

In an example, nodes of a default look-up table are removed to generate a limitation look-up table. Nodes may be removed to model a limitation of a resource, e.g. if the resource is a quantity of Magenta ink then the modelling the limitation may comprise removing nodes that have an area coverage of Magenta or its associated NPs above a particular threshold. Following removal of nodes, a convex hull of the remaining nodes may be computed, e.g. the limited gamut in output color space. Nodes that have been removed may be replaced with a node that is mapped onto the nearest point on the convex hull of the gamut of the remaining nodes. The surface of the gamut formed by the replaced nodes may be determined by replacing each removed surface node with a nearest remaining surface node and using the tessellation of the surface. When working from a default look-up table, some of the original gamut surfaces may end up being projected onto single points or edges of the convex hull; such projections are removed because they are redundant.

The process of adapting a default look-up table to generate a limitation look-up table may comprise evaluating a set of metamers that match a given input color value and then selecting a metamer that is not restricted by a modelled limitation. For example, FIG. 7 shows an example evaluation of metamers for inclusion in a limitation look-up table. In this case, there may be more than one combination of NPs available for producing the same color value 710. For example, the metamers 720, 730, 740 represent different NPac vectors that produce for the same input color value 710. For example, the color value 710 may be mapped to NPac vectors that use the inks NP1 and NP5 in combination with either NP2, NP3 or NP4. If a limitation for a resource is modelled as an unavailability for one of the inks NP2, NP3 or NP4, the corresponding metamers that contain the unavailable ink are ignored and a metamer that does not use the unavailable ink is selected for inclusion as an output color value for the node in an associated limitation look-up table.

In certain examples described herein, one or more resources within an imaging system are modelled such that appropriate color mapping may be used. For example, one or more limitations may be modelled in respect of the resource. A combination of limitations may be modelled at the same time. In one case, when no limitations are modelled, a full gamut of available colors, as represented by a default look-up table, is available. In this case, when a limitation is detected or otherwise activated in the model, a limitation look-up table can be used that provides a color mapping that incorporates the limitation. In multiple limitations are detected, then the nodes of two or more limitation look-up tables may be combined based on a weighting for each node. For example, for any RGB value it may be possible to combine various NPac vectors from a plurality of limitation look-up tables that represent a lack of a particular ink. The weighting may be selected to provide access to the largest gamut volume despite limitations being present. Using a linear combination of nodes from separate look-up tables, e.g. representing a combination of applied limitations, provides an efficient way to represent any number of limitations on the imaging system. This may apply in the case where one limitation exists and a second limitation arises. For example, a cyan ink level may be low and a magenta ink level may then also reach a low level. In this instance, a cyan limitation look-up table may be combined with a magenta limitation look-up table with a linear weighting to create a further limitation look-up table or color mapping that uses least cyan and least magenta. In certain cases the combination may be defined as being convex, i.e. the values within the NPac vector must sum to 1 and each color mapping or look-up table is used proportionally.

Certain examples described herein minimize the need to use an error hiding strategy to accommodate limitations, e.g. such as using multi-pass printing with a modified print mask. As limitations are accommodated in a color mapping, extra stress on hardware components such as print heads and nozzles can be avoided. Certain examples also allow limitations to be accommodated even when error hiding not possible, as may be the case for single pass printing, as again limitations are accommodated in the color mapping rather than relying on an increased number of print passes.

Certain examples described herein provide an ability to compensate for certain failures in an imaging system with minimal impact. For example, this may achieved using proportionally less ink from a printer pen with missing nozzles in its print head. In cases where the imaging system comprises a printing device, the printing device may comprise one or more printer pens, which in turn comprise one or more printer dies, which in turn comprise one or more nozzles. In these cases the resource may relate to one or more of these components, e.g. may be a limitation relating to a printer Certain examples described herein may also be adapted to prevent the effects of "decap". "Decap" is a process when nozzles remain open or uncovered and idle for some time and as such they will no longer print and need to be recovered by purging ink. To prevent "decap" it may be desired to use printer pens and nozzles more uniformly. In this case the resource comprises the nozzles of the printer pen and the limitation comprises using these more uniformly. Using, for example, the methods of FIGS. 2 and 3, uniform nozzle use may be set as a modelled limitation resulting in a set of alternate color mappings that ensure each pen is regularly used and hence does not suffer "decap". By preventing the effects of "decap", ink resources are saved since the need to recover the nozzle's printing ability is removed and hence no purging of ink is necessary. This allows for resources to be used more efficiently and minimizes material costs.

Certain examples described herein allow a printing system to continue printing without compromising performance or print quality if some pens fail or ink resources are low or completely run out. This is achieved using an appropriate amount of each resource based on the state of the imaging system at any given time. The described methods can extend the lifetime or use of each resource and help minimize wasted resources, such as wasted prints due to purging and/or unsatisfactory print quality if one or more inks run out.

For a printing system using CMY inks, an availability of certain colorants may have more of an effect on an available color gamut and hence effect the resulting print quality, e.g. a lack of yellow ink is typically more problematic than a lack of cyan ink. As such, a variation of the described examples provides a warning system to alert a user to any existing limitations that would undesirably degrade imaging quality. For example, in a case where a yellow ink runs out the performance of the printing system may be compromised and the quality of the print output may be low. In this case, instead of, or in additional to using an alternate print mapping, it may be desired to stop printing and replace an ink cartridge for the yellow ink. In this case, a warning may be provided to a user to inform them of the limitation.

While certain Figures have been described herein, it is to be understood that the methods described herein may be performed without any explicit visualization. For example, a look-up table may be determined using a mathematical operation without plotting points in multi-dimensional space. Other limitations may comprise preserving a low ink level and/or extending the life of a given print cartridge.

Certain examples herein make use of an NPac color space. An NPac color space enables a given RGB color value to be represented using a plurality of NPac vectors representing different colorant combinations and area coverages that nevertheless are perceived as the same color as the given RGB color value. Each of these plurality of NPac vectors may be referred to as a "metamer". By using an NPac color space, a color mapping may be selected that results, for the given RGB color value, in an NPac that is minimally adversely affected by one or more modelled and/or measured limitations. For example, if a nozzle usage and/or an ink level for a particular printing fluid means that the level of the printing fluid needs to be below a set threshold, then an NPac from a set of metamers may be selected that meets this requirement, notwithstanding the fact that an NPac from a default color mapping may be unavailable due to the limitation.

Certain examples described herein may be used with inkjet and other types of printer for example Hewlett Packard's Designjet printers. Certain examples may also be used with Liquid Electrophotographic (LEP) printers, such as the Indigo range of printers supplied by Hewlett Packard Company of Palo Alto, Calif. In an ink jet implementation, ink may be supplied from one or more ink cartridges and deposited onto a print medium through the use of one or more nozzle actuators in a print head. The print control data may instruct which nozzles in a print head should fire in order to deposit one or more drops of ink at each pixel in the image. Although certain printing device examples have been described with reference to one or more colorant levels, it should be understood that the color mappings may be extended to other printing fluids such as glosses and/or varnishes that may be deposited in a printing system and that may alter a perceived output color.

Figure 8:
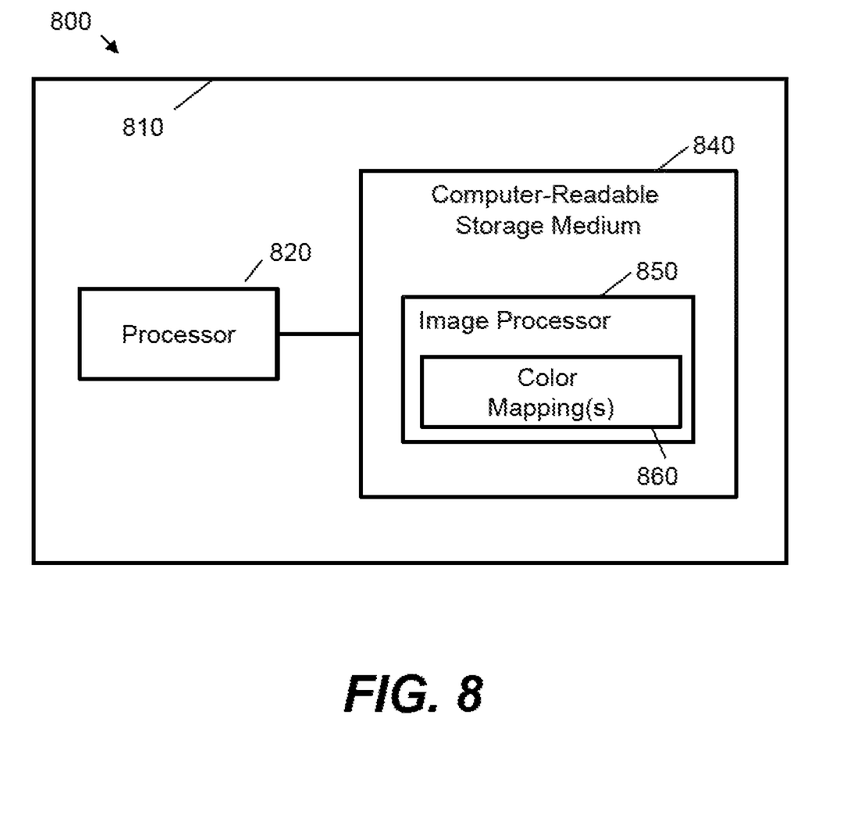
FIG. 8 is a schematic diagram showing a computer system according to an example.

Certain methods and systems as described herein may be implemented by a processor that processes computer program code that is retrieved from a non-transitory storage medium. FIG. 8 shows an example 800 of a computer device 810 comprising a computer-readable storage medium 840 coupled to a processor 820. Computer-readable media 840 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable computer-readable media include, but are not limited to, a hard drive, a random access memory (RAM), a read-only memory (ROM), an erasable programmable read-only memory, or a portable disc. In FIG. 8, the computer-readable storage medium comprises computer program code to implement an image processor 850 and data representative of one or more color mappings 860. The image processor 850 may implement one or more of the methods described above.

Similarly, it should be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer program code stored in (non-transitory) memory and executable by the processor, or by hardware, or by a combination of tangibly stored code and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for generating a color mapping comprising:
   selecting a resource within an imaging system, the resource corresponding to a color of the imaging system and the resource being degraded;
   removing, from a non-degraded color mapping that maps color values from a first color space to a second color space and in which the resource is not degraded, a plurality of nodes referencing the color to which the degraded resource corresponds, generating an incomplete color mapping including a plurality of remaining nodes of the non-degraded color mapping;
   computing a convex hull of the remaining nodes within the incomplete color mapping, the convex hull representing a gamut of the remaining nodes; and
   for each node removed from the non-degraded color mapping, adding to the incomplete color mapping a replacement node that maps to a nearest point on the computed convex hull representing the gamut of the remaining nodes, generating a degraded color mapping that compensates for the degraded resource within the imaging system.

2. The method of claim 1, wherein each color mapping comprises a look-up-table.

3. The method of claim 1, wherein the imaging system is a color halftone printing system.

4. The method of claim 1, wherein:
   the resource comprises one of: printer pens, printer dies and printer nozzles, and
   the limitation comprises one of a limitation on printing fluid usage and print nozzle usage.

5. The method of claim 1, wherein the first color space comprises a red, green, blue (RGB) color space.

6. The method of claim 1, wherein the resource that is degraded comprises a malfunctioning printer pen of the imaging system.

7. The method of claim 1, wherein the resource that is degraded comprises an inadequate quantity of ink within the imaging system.

8. The method of claim 1, wherein the resource that is degraded comprises an inoperative display element of the imaging system.

9. A method for color mapping comprising:
   obtaining a measurement of characteristics of an imaging system, the measurement indicating a limitation on a resource for the imaging system, the resource corresponding to a color of the imaging system and the resource being degraded; and
   selecting a degraded color mapping based on the measurement, the degraded color mapping compensating for the degraded resource within the imaging system and corresponding to a non-degraded color mapping that maps color values from a first color space to a second color space and in which the resource is not degraded,
   wherein each of a plurality of nodes of the non-degraded color mapping that references the color to which the degraded resource corresponds is replaced within the degraded color mapping with a replacement node that maps to a nearest point on a convex hull of a plurality of remaining nodes of an incomplete color mapping corresponding to the non-degraded color mapping and from which the nodes referencing the color to which the degraded resource corresponds have been removed.

10. The method of claim 9, wherein each color mapping comprises a look-up table.

11. The method of claim 9, wherein the resource comprises a printer pen and the limitation comprises one of a limitation on printing fluid usage and print nozzle usage.

12. The method of claim 9, wherein the first color space comprises a red, green, blue (RGB) color space.

13. The method of claim 9, comprising alerting a user of the imaging system to a limitation of a resource in the imaging system.

14. A non-transitory machine-readable storage medium encoded with instructions for color mapping, the instructions executable by a processor of a system to cause the system to:
   obtain a measurement of characteristics of an imaging system, the measurement indicating a limitation on a resource for the imaging system, the resource corresponding to a color of the imaging system and the resource being degraded; and
   select a degraded color mapping based on the measurement, the degraded color mapping compensating for the degraded resource within the imaging system and corresponding to a non-degraded color mapping that maps color values from a first color space to a second color space and in which the resource is not degraded, wherein each of a plurality of nodes of the non-degraded color mapping that references the color to which the degraded resource corresponds is replaced within the degraded color mapping with a replacement node that maps to a nearest point on a convex hull of a plurality of remaining nodes of an incomplete color mapping corresponding to the non-degraded color mapping and from which the nodes referencing the color to which the degraded resource corresponds have been removed.

* * * * *

UNITED STATES PATENT AND TRADEMARK OFFICE
CERTIFICATE OF CORRECTION

| | |
|---|---|
| PATENT NO. | : 10,868,943 B2 |
| APPLICATION NO. | : 15/305271 |
| DATED | : December 15, 2020 |
| INVENTOR(S) | : Peter Morovic et al. |

It is certified that error appears in the above-identified patent and that said Letters Patent is hereby corrected as shown below:

On the Title Page

Item (71):

Remove Applicants:
Peter Morovic, Sant Cugat del Valles (ES)
Jan Morovic, Colchester (GB)
Juan Manuel Garcia Reyero Vinas, Sant Cugat del Valles (ES)
David Gaston, Sant Cugat del Valles (ES)

Applicant address:
11445 Compaq Center Drive West, Houston, TX 77070
Should read:
10300 Energy Dr., Spring, TX 77389

Signed and Sealed this
Twenty-sixth Day of April, 2022

Katherine Kelly Vidal
*Director of the United States Patent and Trademark Office*